July 17, 1934.    H. LENZ    1,966,966
SEED PLANTER
Filed July 6, 1932    2 Sheets-Sheet 1
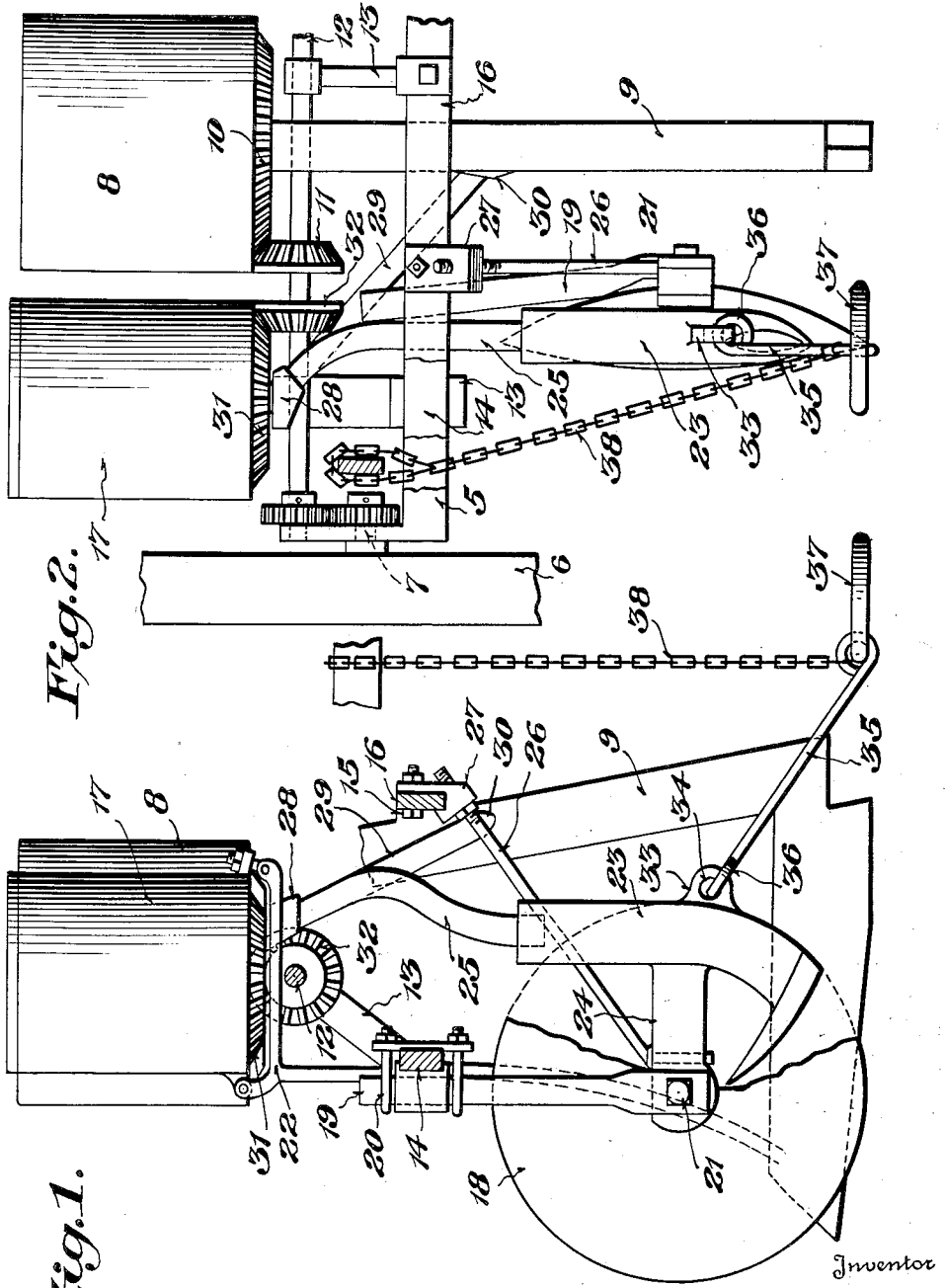
Inventor
Henry Lenz,
By Erich H. Michaelis
Attorney July 17, 1934.  H. LENZ  1,966,966
SEED PLANTER
Filed July 6, 1932  2 Sheets-Sheet 2
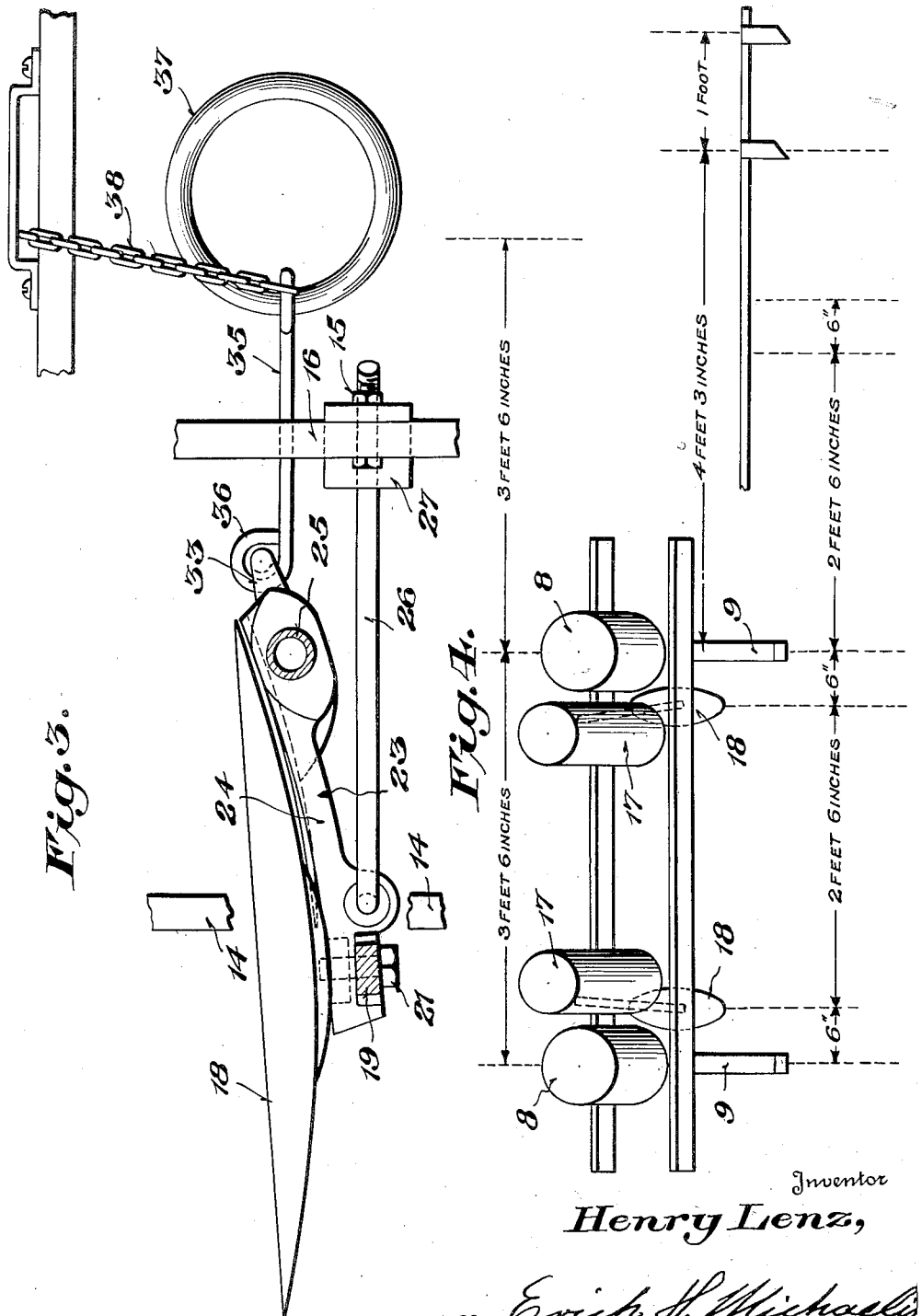
Inventor
Henry Lenz,
By Erich H. Michaels
Attorney Patented July 17, 1934

1,966,966

UNITED STATES PATENT OFFICE 1,966,966

SEED PLANTER

Henry Lenz, Moneta, Iowa

Application July 6, 1932, Serial No. 621,074

1 Claim. (Cl. 111—80)

The invention relates to agricultural machinery and more specially to so-called planters.

The object of the invention is to provide an attachment which is adapted to be attached to a corn planter or a similar machine to make it possible to plant soy beans, millet and the like at the same time corn is being planted.

Another object of the invention is to provide an attachment adapted to be attached to a corn planter or the like with which it is possible to plant soy beans or the like between the rows of corn, so that more land is being used and less acreage is left fallow.

A still other object of the invention is to provide an attachment adapted to be attached to a corn planter or the like which is arranged to plant two rows of corn in a distance of about 42 inches so that soy beans, millet or the like may be planted between the rows of corn and at a distance from said rows of about 6 inches, so that the distance between the inner rows in which the soy beans or the like are planted will be about 40 inches, and this land can actually not be looked upon as fallow land, since this distance can be hoed to eliminate weeds and the like and because the roots of the soy beans are 18 feet long so that the land between the soy bean rows is actually nourishing and feeding the plants in the inner rows. The strip of six inches between the outer rows and the adjacent inner ones do not need to be hoed, since the plants in the two rows longside of this strip will shade the strip and weeds do not grow in shaded land.

A further object of the invention is to provide an attachment adapted to be used in connection with a corn planter or the like, so that soy beans or the like can be planted in such a distance from the rows of corn, that more than double the number of planted rows may be obtained than without the attachment.

Other objects of the invention not specifically mentioned may be easily ascertained and understood from the following description in connection with the drawings forming a part thereof. It is however to be understood, that the invention is not to be limited and restricted to the exact construction and formation shown in the drawings and described in the specification, but that said invention is only to be limited and restricted by the scope of the claim appended to this specification.

In the drawings forming as stated above a part of the specification

Fig. 1 is a side view of the attachment forming the subject matter of the present invention.

Fig. 2 is an end view of the attachment according to the present invention shown attached to a suitable agricultural machine indicated diagrammatically.

Fig. 3 is a top view of the attachment according to the present invention, and

Fig. 4 is a diagrammatical plan illustrating approximately the arrangement of the planted rows.

In the drawings and specification the attachment is illustrated and described as being attached to a corn planter adapted to plant two rows of corn at a distance of about 42 inches. It is however to be understood, that any other suitable agricultural machine be used to be equipped with the attachment according to the present invention.

The corn planter has a frame 5 consisting of a plurality of members of which only those are indicated in the drawings which are necessary for the understanding of the present invention. In the frame running wheel 6 are rotatably mounted by means of short axles 7.

Well known seed boxes 8 are fastened in any suitable and convenient manner (not shown) to the frame. Planting shoes 9 are connected with the seed boxes 8 so that they will receive seed from said boxes by means of a well known mechanism, which is indicated in the drawings, but not described, since it does not constitute any part of the present invention. It suffices to say, that the mechanism is actuated by means of a bevel gear 10, which meshes with and is rotated by a bevel pinion 11. This pinion 11 is rigidly mounted on a shaft 12, which in turn is rotatably journaled in bearing brackets 13 supported by a frame member 14.

Preferably the attachment according to the invention is attached to a corn planter having two seed boxes 8 as stated above, and the distance between the mouth of the planter shoes is commonly 42 inches. The actuating mechanism for the planter boxes is the same for both.

Each planter shoe has at its rear surface a supporting and guiding lug 15, in which a guiding slot is provided adapted to receive a frame member 16.

Intermediate the two seed boxes 8, which in the illustrated case would contain corn, two additional seed boxes 17 are arranged adapted to receive soy beans or the like.

On the frame member 14 supporting as stated, above the bracket bearings 13 a pair of disk hillers are adjustably fastened. Said disk hillers 18 have each a vertical supporting shaft 19 which is clamped to the frame member 14 by means of a clamping mechanism 20 of any convenient and suitable construction. Adjacent the lower end of the vertical supporting shaft 19 a horizontal short shaft 21 is rigidly attached to the vertical shaft and on this horizontal shaft the disk of the hiller is rotatably mounted. To the clamping means 20 the connecting mechanism 22 is fastened, which holds the disk hiller and the additional seed box together. The seed guide 23 of the hiller is provided with a supporting bracket 24, which is rigidly, but removably mounted on the short horizontal shaft 21. A flexible tube 25 connects the outlet of the additional seed box 17 with the inlet of the seed guide 23. This additional unit consisting of seed box 17 and the disk hiller can be moved lengthwise of the frame member 14, which extends parallel to the supporting frame member 16, so that the distance between outlet of the seed guide 23 and the shoe 9 may be adjusted. In the case described in this specification and illustrated in the accompanying drawings the distance is preferably six inches. In order to strengthen the seed guide 23 a brace rod 26 is provided. The lower end of this brace is rigidly fastened to the supporting bracket 24 of the seed guide 23. On the upper end of the brace a clamping lug 27 is adjustably mounted and this clamping lug is adapted to engage the frame member 16 and to be clamped to said member.

The outlet of the additional seed box 17, which indicated at 28, may be so constructed, that it will not only communicate with the upper or intake end of the flexible tube 25, but can also communicate with an additional tube 29 at the upper end thereof. The lower or outlet end of this tube ends in the seed shoe 9 as clearly shown at 30 in Figs. 1 and 2.

The planting mechanism of the additional seed box is constructed in the same known manner as the corresponding mechanism of the corn seed box and this mechanism is actuated by a bevel gear 31, which meshes with and is rotated by a bevel pinion 32 rigidly mounted on the above mentioned shaft 12. This shaft may be driven from the wheel of the planter.

On the rear surface of the seed guide 23 of the disk hiller a drag lug 33 is provided having an eye 34 adapted to receive the end of a rod or wire 35, which also formed into an eye 36. The lower end of this wire rod is connected to a drag ring 37, which is adapted to slide over the row containing the soy bean seed, and thereby to cover said seed. In order to prevent the ring to get underneath the disk hiller after the same has been lifted out of the land, a light chain 38 is provided, which connects said ring with a frame member extending at right angles to the members 14 and 16.

By using the attachment described above more than the double number of planted rows will be obtained and in consequence the crop will be increased correspondingly. In addition to that a better distribution of the plant above the ground and of the roots in the ground may be obtained. The plants in those rows, which are only six inches from each other apart, may lean toward each other so that they will intertwine and thereby support each other and prevent each other from falling over. Plants resting on the ground between the two inner rows, which are 30 inches from each other apart, may be harvested by means of a corn binder, which will pick up the fallen stems of the ripe plants and cut them.

Having described my invention, the advantages thereof and how the same is to be used I claim as new and desire to secure by Letters Patent:

In a seed planter having a seed box and a planting shoe, an additional seed box, and an additional planting shoe, the additional seed box having a two way outlet adapted to feed both planting shoes.

HENRY LENZ.